United States Patent
Kim et al.

(10) Patent No.: US 9,509,458 B2
(45) Date of Patent: Nov. 29, 2016

(54) TRANSMISSION METHOD AND TRANSMISSION DEVICE

(71) Applicant: LG ELECTRONICS INC., Seoul (KR)

(72) Inventors: Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 99 days.

(21) Appl. No.: 14/380,491

(22) PCT Filed: Feb. 22, 2013

(86) PCT No.: PCT/KR2013/001413
§ 371 (c)(1),
(2) Date: Aug. 22, 2014

(87) PCT Pub. No.: WO2013/125887
PCT Pub. Date: Aug. 29, 2013

(65) Prior Publication Data
US 2015/0055616 A1    Feb. 26, 2015

Related U.S. Application Data

(60) Provisional application No. 61/602,599, filed on Feb. 24, 2012.

(51) Int. Cl.
*H04W 4/00* (2009.01)
*H04L 5/00* (2006.01)
(Continued)

(52) U.S. Cl.
CPC .............. *H04L 5/0007* (2013.01); *H04J 11/00* (2013.01); *H04L 27/2605* (2013.01); *H04L 27/2636* (2013.01); *H04L 27/2643* (2013.01);
(Continued)

(58) Field of Classification Search
CPC ........... H04W 72/0446; H04W 88/08; H04W 72/0453
See application file for complete search history.

(56) References Cited

U.S. PATENT DOCUMENTS

2009/0080385 A1    3/2009    Kim et al.
2009/0245399 A1    10/2009    Lee et al.
(Continued)

FOREIGN PATENT DOCUMENTS

KR    10-2007-0039760 A    4/2007
KR    10-2007-0103917 A    10/2007
KR    10-0779092 B1    11/2007

OTHER PUBLICATIONS

U.S. Appl. No. 61/591,827 Provisional Specification, "Physical Layer Issues Related to Multi-TA Group Support", filed Jan. 27, 2012.*

(Continued)

*Primary Examiner* — Hassan Phillips
*Assistant Examiner* — Siren Wei
(74) *Attorney, Agent, or Firm* — Birch, Stewart, Kolasch & Birch, LLP

(57) ABSTRACT

A wireless device generates a synchronization signal for maintaining synchronization and transmits the synchronization signal in a subframe containing a plurality of orthogonal frequency division multiplexing (OFDM) symbols. The first OFDM symbol in the subframe is divided into a first part and a second part, the last OFDM symbol in the subframe is divided into a first part and a second part, and the synchronization signal is transmitted in the second part of the first OFDM symbol and the first part of the last OFDM symbol.

4 Claims, 12 Drawing Sheets

(51) Int. Cl.
*H04W 56/00* (2009.01)
*H04L 27/26* (2006.01)
*H04J 11/00* (2006.01)

(52) U.S. Cl.
CPC .......... *H04L27/2692* (2013.01); *H04W 56/00* (2013.01); *H04J 2011/0096* (2013.01); *H04L 5/0023* (2013.01); *H04L 5/0051* (2013.01)

(56) References Cited

U.S. PATENT DOCUMENTS

| | | | | |
|---|---|---|---|---|
| 2010/0067453 A1* | 3/2010 | Noh | .................. | H04W 72/0413 370/329 |
| 2010/0165954 A1 | 7/2010 | Lin et al. | | |
| 2010/0278081 A1 | 11/2010 | Dai et al. | | |
| 2011/0228722 A1* | 9/2011 | Noh | .................... | H04L 27/2605 370/315 |
| 2013/0195084 A1* | 8/2013 | Chen | ................. | H04W 72/0413 370/336 |
| 2013/0201016 A1* | 8/2013 | Lo | ........................ | G08B 27/006 340/502 |

OTHER PUBLICATIONS

U.S. Appl. No. 61/595,578 Provisional Specification, "Emergency Networks ans Systems for Search and Rescue", filed Feb. 6, 2012.*

* cited by examiner

TRANSMISSION METHOD AND TRANSMISSION DEVICE

CROSS REFERENCE TO RELATED APPLICATIONS

This application is the National Phase of PCT International Application No. PCT/KR2013/001413, filed on Feb. 22, 2013, which claims priority under 35 U.S.C. 119(e) to U.S. Provisional Application No. 61/602,599, filed on Feb. 24, 2012, all of which are hereby expressly incorporated by reference into the present application.

BACKGROUND OF THE INVENTION

1. Field of the Invention

The present invention relates to wireless communications, and more particularly, to a transmission method and transmission device for communication between wireless devices in a wireless communication system.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

Device-to-device (D2D) communication is a distributed communication technique in which neighboring wireless nodes directly deliver direct traffic. In the D2D communication, a wireless node such as a mobile phone autonomously discovers another wireless node which is physically neighboring thereto, and establishes a communication session and thereafter transmits traffic. The D2D communication can solve a traffic overload problem by distributing traffic concentrated to a base station. The D2D technique such as Bluetooth or Wi-Fi Direct directly supports communication between the wireless nodes without an aid of the base station.

It is necessary to consider a propagation delay between the wireless nodes when the D2D communication is designed. Although the Bluetooth supports data communication between wireless nodes separated by up to 100 m, an actual effective range is far less than that. When a distance between the wireless nodes is more increased, it is necessary to consider a path loss and a timing advance.

SUMMARY OF THE INVENTION

The present invention provides a transmission method and transmission device for communication between wireless devices.

In an aspect, a transmission method in a wireless communication system includes generating a synchronization signal for maintaining a synchronization between wireless devices, and transmitting the synchronization signal in a subframe including a plurality of orthogonal frequency division multiplexing (OFDM) symbols. A first OFDM symbol of the subframe is divided into a first part and a second part, a last OFDM symbol of the subframe is divided into a first part and a second part, and the synchronization signal is transmitted in the second part of the first OFDM symbol and the first part of the last OFDM symbol.

The first part of the first OFDM symbol and the second part of the last OFDM symbol may be used as a guard interval (GI).

Each of the first part and the second part may have a size of ½ OFDM symbol.

In another aspect, a transmission device in a wireless communication system includes a signal generator for generating a synchronization signal for maintaining a synchronization, and a signal transmitter for transmitting the synchronization signal in a subframe including a plurality of orthogonal frequency division multiplexing (OFDM) symbols. A first OFDM symbol of the subframe is divided into a first part and a second part, a last OFDM symbol of the subframe is divided into a first part and a second part, and the synchronization signal is transmitted in the second part of the first OFDM symbol and the first part of the last OFDM symbol.

Synchronization maintenance and synchronization tacking are possible for communication between wireless devices by considering a propagation delay.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-advanced (LTE-A). This is for exemplary purposes only, and thus the present invention is applicable to various communication systems. In the following description, LTE and/or LTE-A are collectively referred to as LTE.

The LTE system is not allowed for direct communication between wireless devices, and is scheduled by the BS. In order to distribute increasing data traffic, it is considered to support device-to-device (D2D) communication between the wireless devices without the BS or with the BS performing scheduling to a minimum extent.

Figure 1:
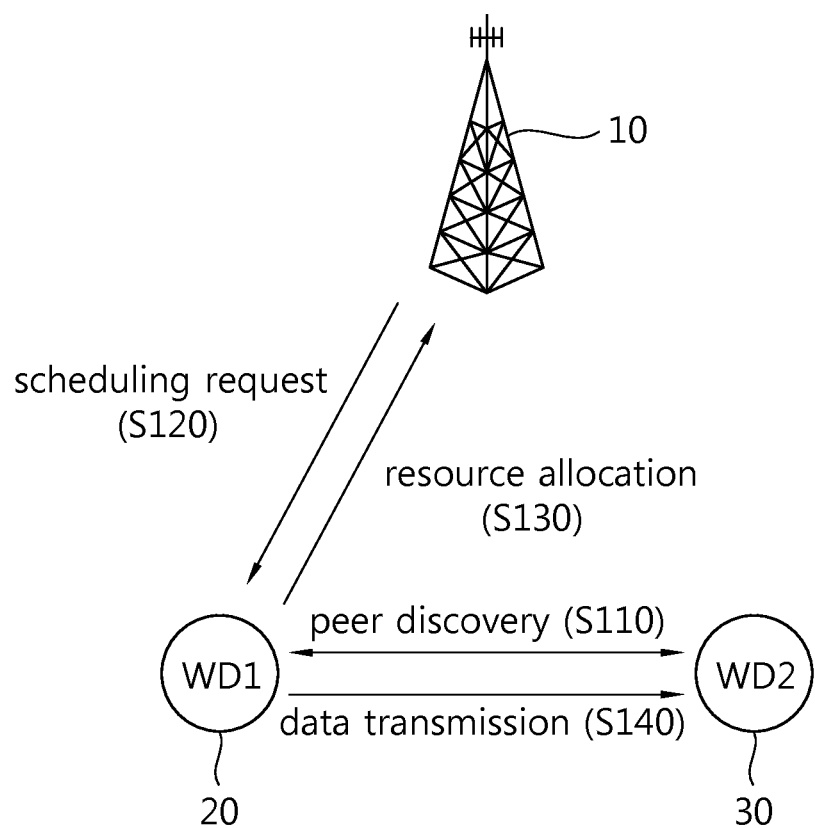
FIG. 1 shows an example of device-to-device (D2D) communication.

FIG. 1 shows an example of D2D communication.

Each of a wireless device (WD)1 20 and a WD2 30 establishes a connection (e.g., a radio resource control (RRC) connection) with a BS 10.

The WD1 20 and the WD2 30 are located within a distance allowing communication with each other, and perform peer discovery to identify each other (step S110). For the peer discovery, the WD1 20 and the WD2 30 may broadcast an identification message including identification information thereof and/or a synchronization signal. The WD1 20 and the WD2 30 may periodically discover an identification message of a peer device, or may discover it at a request of the BS.

Although only two WDs 20 and 30 are considered herein, this is for exemplary purposes only. For clear understanding, it is described for example that the WD1 20 transmits data to the WD2 30.

The WD1 20 sends to the BS 10 a scheduling request for transmission to the WD2 30 (step S120). The scheduling request may include information regarding a channel state (e.g., a channel quality indicator (CQI), a timing difference, etc.) between the WD1 20 and the WD2 30.

The BS 10 sends to the WD1 20 a resource allocation (step S130). The WD1 20 transmits to the WD2 30 a data packet based on the resource allocation (step S140).

Although it is described above that the D2D communication between the WDs is achieved by scheduling, the embodiment of the present invention may apply to direct communication between the WDs without an intervention of the BS For the D2D communication, a synchronization between peer WDs is allowed to be maintained, or if the synchronization is not maintained, data transmission including a synchronization signal is necessary.

In order to maintain a synchronization between a BS and a WD in the existing mobile communication system, a timing advance is used between the BS and the WD. However, a timing difference and/or a propagation delay between WDs need to be taken into consideration in the D2D communication. A data packet transmitted from the WD1 20 to the WD2 30 experiences the propagation delay, which may cause the timing difference between the WDs.

Figure 2:
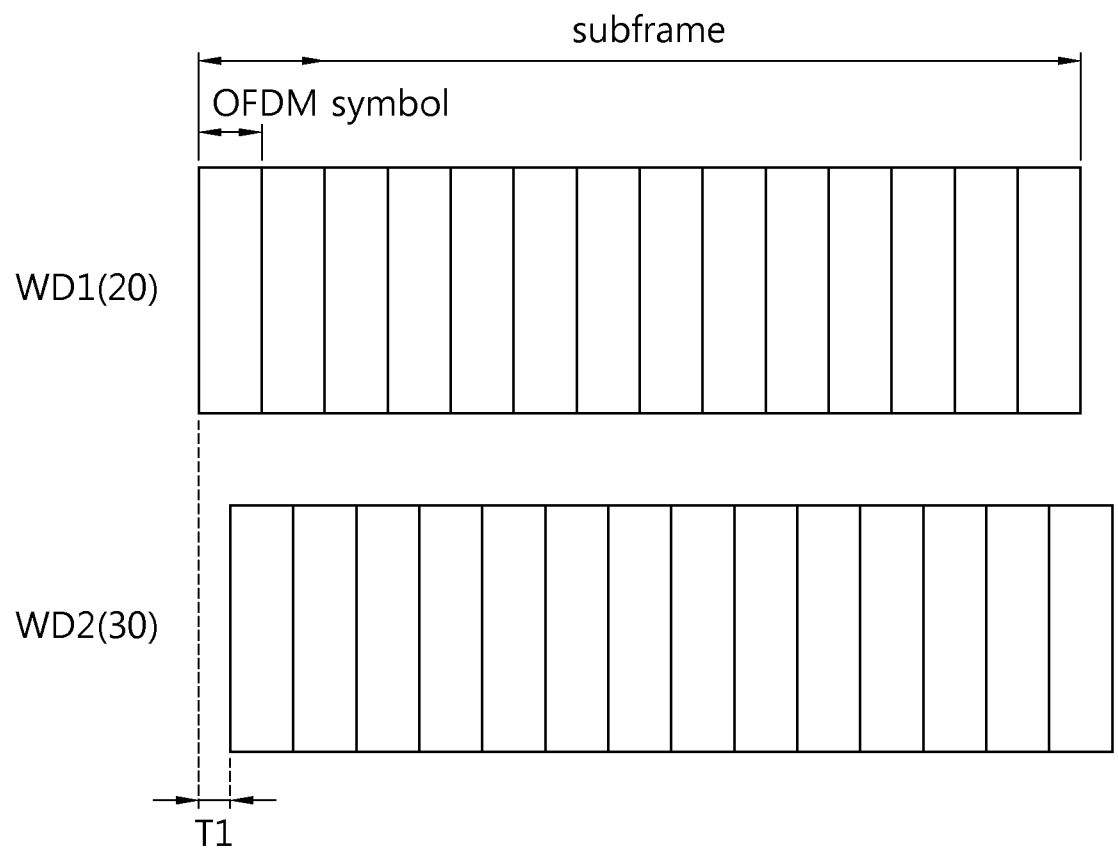
FIG. 2 shows an example of a timing difference between wireless devices.

FIG. 2 shows an example of a timing difference between WDs.

A WD1 20 transmits a subframe in a specific subframe. Due to a propagation delay, a WD2 30 receives the subframe after a specific time T1.

Hereinafter, the subframe is a resource allocation unit including a plurality of orthogonal frequency division multiplexing (OFDM) symbols. A data packet may be transmitted in one or more OFDM symbols of the subframe. A time required for transmitting one subframe is defined as a transmission time interval (TTI). For example, one subframe may have a length of 1 millisecond (ms). Although it is described for example that the subframe includes 14 OFDM symbols, this is only for exemplary purposes only.

Since the 3GPP LTE uses orthogonal frequency division multiple access (OFDMA) in a downlink (DL), the OFDM symbol is only for expressing one symbol period in the time domain, and there is no limitation in a multiple access scheme or a terminology. For example, the OFDM symbol may also be referred to as another terminology such as a single carrier frequency division multiple access (SC-FDMA) symbol, a symbol period, etc.

Figure 3:
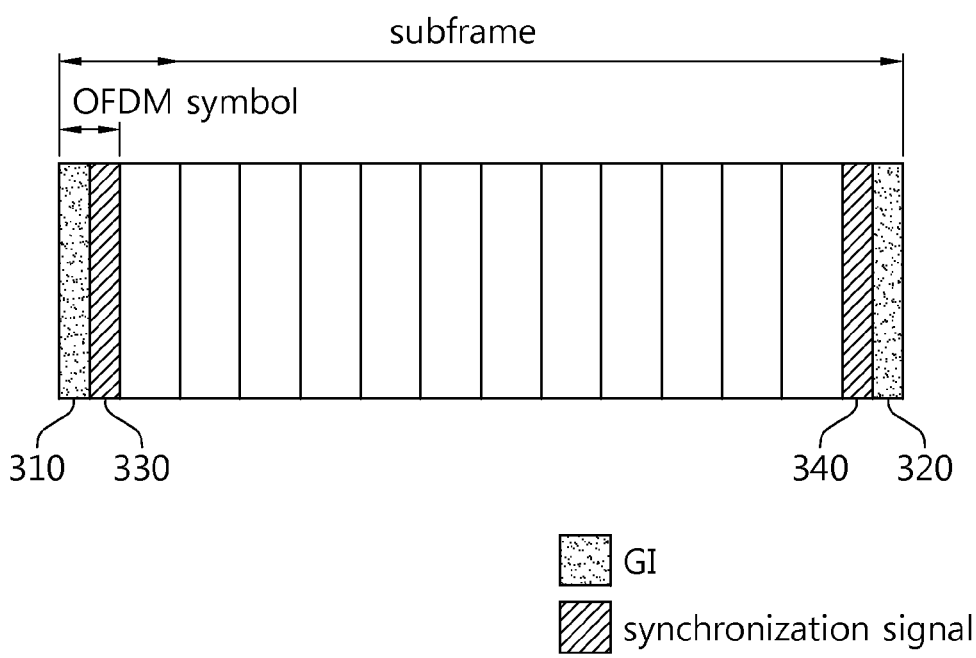
FIG. 3 shows a subframe structure according to an embodiment of the present invention.

FIG. 3 shows a subframe structure according to an embodiment of the present invention.

Each of a first OFDM symbol and a last OFDM symbol of the subframe is divided into two parts. A first part may include a guard interval (GI), and a second part may include a synchronization signal. More specifically, the first OFDM symbol may include a GI 310 and a synchronization signal 330, in that order, and the last OFDM symbol may include a synchronization signal 340 and a GI 320, in that order.

The GIs 310 and 320 are areas in which no signal is transmitted or received. The WD1 20 and the WD2 30 may transmit no signal in the GIs 310 and 320.

The synchronization signals 330 and 340 may be used for synchronization adjustment or synchronization tracking between the WDs. The term of the synchronization signals 330 and 340 is for exemplary purposes only. The synchronization signals 330 and 340 are signals which are known between the WDs, and may be used for various usages. The synchronization signals 330 and 340 may be used for channel estimation or data demodulation between the WDs, and may also be called in various terms such as a reference signal, a channel state information (CSI) signal, a sounding signal, a tracking signal, a preamble, a midamble, etc.

If a propagation delay between the WD1 20 and the WD2 30 is less than up to ½ OFDM symbol, the GIs 310 and 320 may occupy the ½ OFDM symbol and the synchronization signals 330 and 340 occupy the ½ OFDM symbol. However, a ratio thereof may vary.

The GI is used to overcome transmit (TX)/receive (RX) switching and a timing difference between devices. If the WD2 needs to receive data from the WD1 and thereafter transmits the data, an RX-to-TX switching time is required. In addition, a timing advance varies due to a distance change or the like between the WD1 and the WD2. In order to know the timing difference between devices, the WD1 and/or the WD2 may report or share information related to the timing difference. For example, the WD1 may report the timing difference to the WD2. The WD1 may report to the WD2 about information indicating how much difference is there in a subframe boundary or an OFDM symbol boundary.

If the WD1 and the WD2 recognize the timing difference, it may be used to determine whether D2D communication is possible, the number/length of OFDM symbols in a subframe, a start location of the subframe, a size of a GI, a size of a synchronization signal, etc.

A length of the GI and a length of the synchronization signal may be fixed to a specific length (e.g., ½ OFDM symbol), or may change according to a communication environment. The length may be determined to a different value in a TX end and an RX end. It may not exist in the TX end but may exist in the RX end, and the other way around is also possible.

Figure 4:
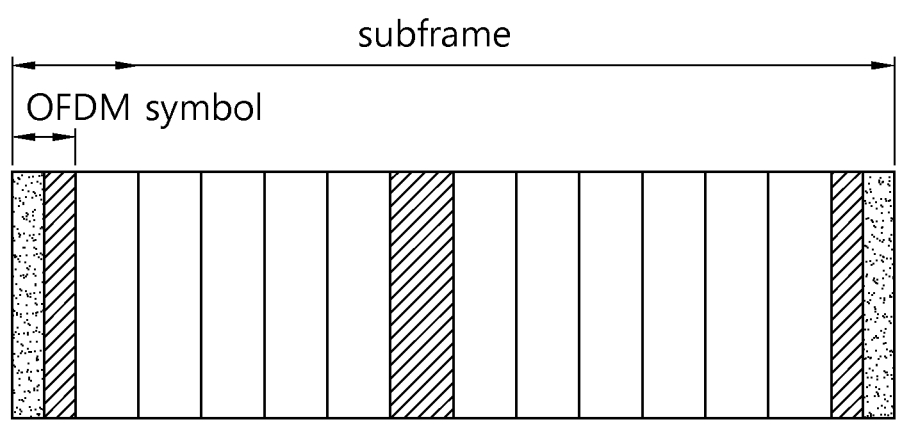
FIGS. 4, 5, and 6 show a subframe structure according to another embodiment of the present invention.
Figure 5:
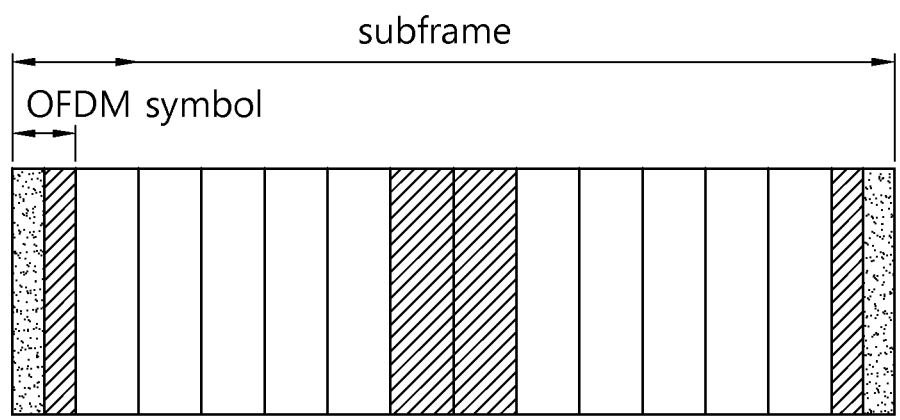
Figure 6:
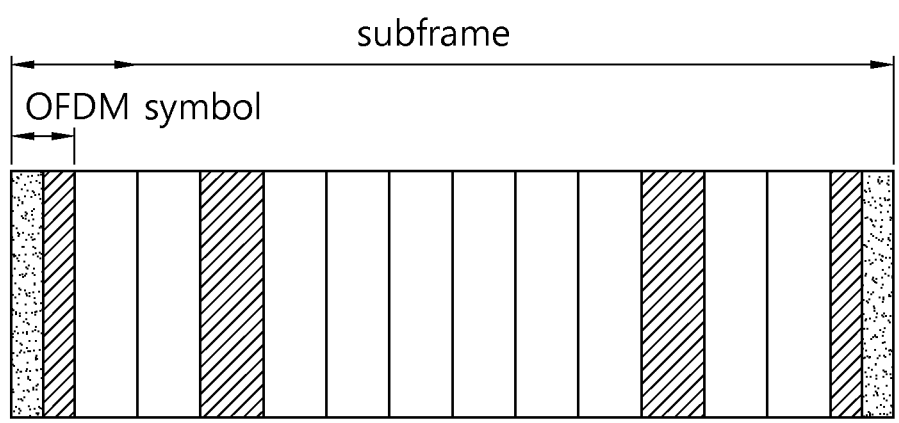

FIGS. 4, 5, and 6 show a subframe structure according to another embodiment of the present invention.

In addition to a first OFDM symbol and a last OFDM symbol of a subframe, it is shown that a synchronization signal can be arranged to the subframe in various locations and various numbers.

The subframe structures of FIG. 3 to FIG. 6 may be used in combination. For example, the subframe of FIG. 3 may be used in a specific time, and the subframe of FIG. 4 may be used in a next time.

Due to a GI, a synchronization signal is transmitted in a part of the first and last OFDM symbols of the subframe. A synchronization signal transmitted in the remaining OFDM symbols occupies one OFDM symbol. A synchronization signal transmitted in a part of an OFDM symbol is called a short synchronization signal, and a synchronization signal transmitted in one OFDM symbol is called a long synchronization signal.

Now, a structure of a synchronization signal is described.

A well-known sequence such as a Zadoff-Chu sequence may be used as the synchronization signal.

For example, the Zadoff-Chu sequence with a length N may be defined as follows.

$$r(n) = e^{-j\frac{\pi qm(m+1)}{N}} \quad \text{[Equation 1]}$$

Herein, q is a root index, and m=0, . . . , N−1. N and q are a relatively prime.

A sequence for a UL reference signal disclosed in the section 5.5.1 of 3GPP TS 36.211 V10.4.0 (2011 December) may be used as a synchronization signal.

If a long synchronization signal is transmitted in an OFDM symbol with a size two times greater than a short synchronization signal, a sequence which is repeated two times in a time domain may be used. It is assumed that the short synchronization signal is transmitted in ½ OFDM symbol, and the long synchronization signal is transmitted in 1 OFDM symbol. Therefore, the long synchronization signal may be configured such that the short synchronization signal is repeated two times.

Figure 7:
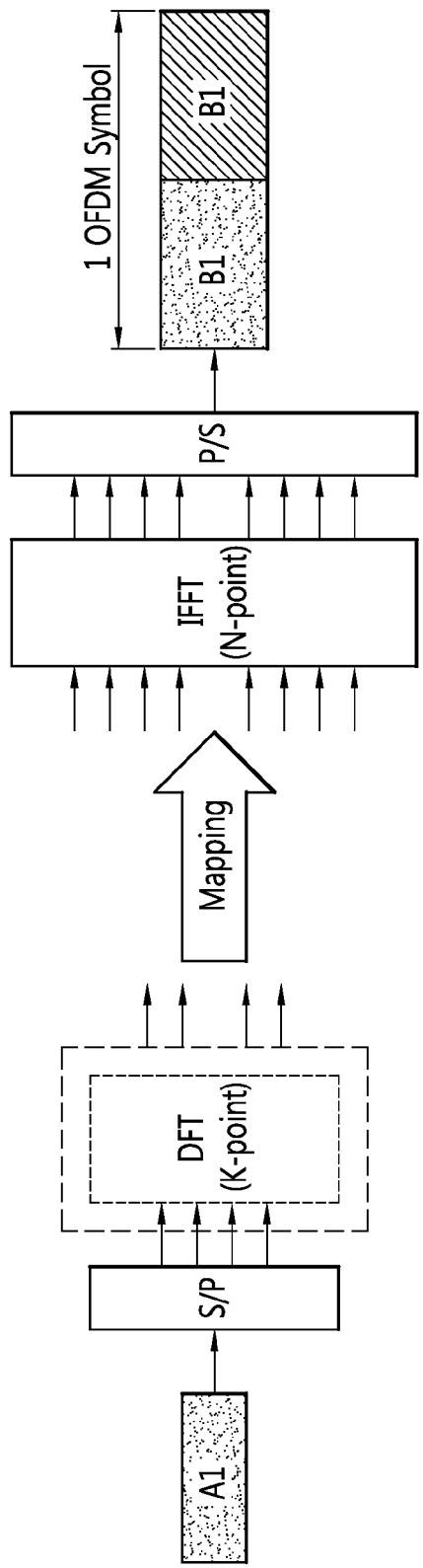
FIG. 7 shows an example of transmitting a long synchronization signal.

FIG. 7 shows an example of transmitting a long synchronization signal.

A sequence A1 is subjected to discrete Fourier transform (DFT), and is then mapped to a subcarrier. If a multiple access scheme is OFDMA, the DFT process may be omitted. After performing N-point inverse fast Fourier transform (IFFT), the sequence is converted to a serial signal. The sequence A1 becomes a signal which is repeated two times in one OFDM symbol. That is, B1 is repeated two times.

Figure 8:
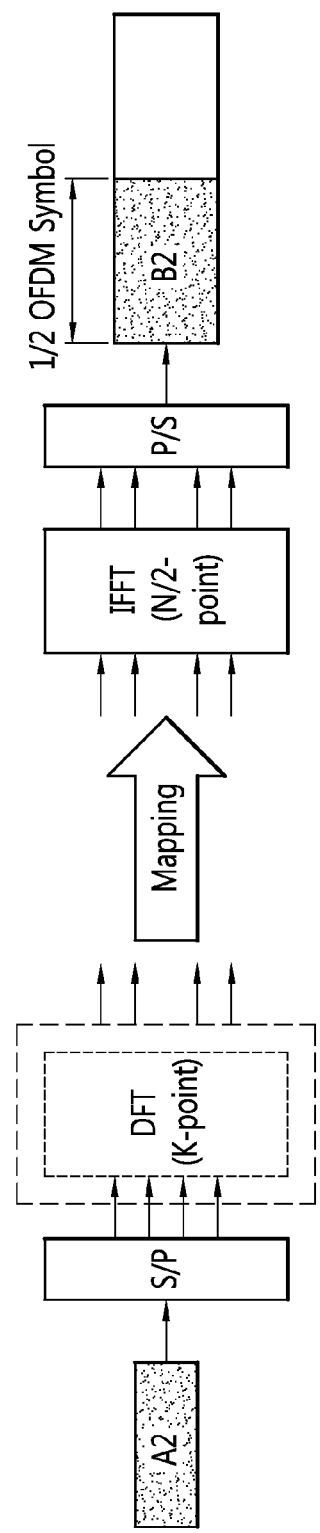
FIG. 8 shows an example of transmitting a short synchronization signal.

FIG. 8 shows an example of transmitting a short synchronization signal.

In a process of performing IFFT, a sequence A2 is subjected to not N-point IFFT but N/2-point IFFT. That is, the number of points to be sampled is half in comparison with a long synchronization signal. Then, a signal B2 is arranged only in ½ OFDM symbol.

The sequences A1 and A2 may be the same sequence or may be different sequences generated by using different cyclic shift values.

Figure 9:
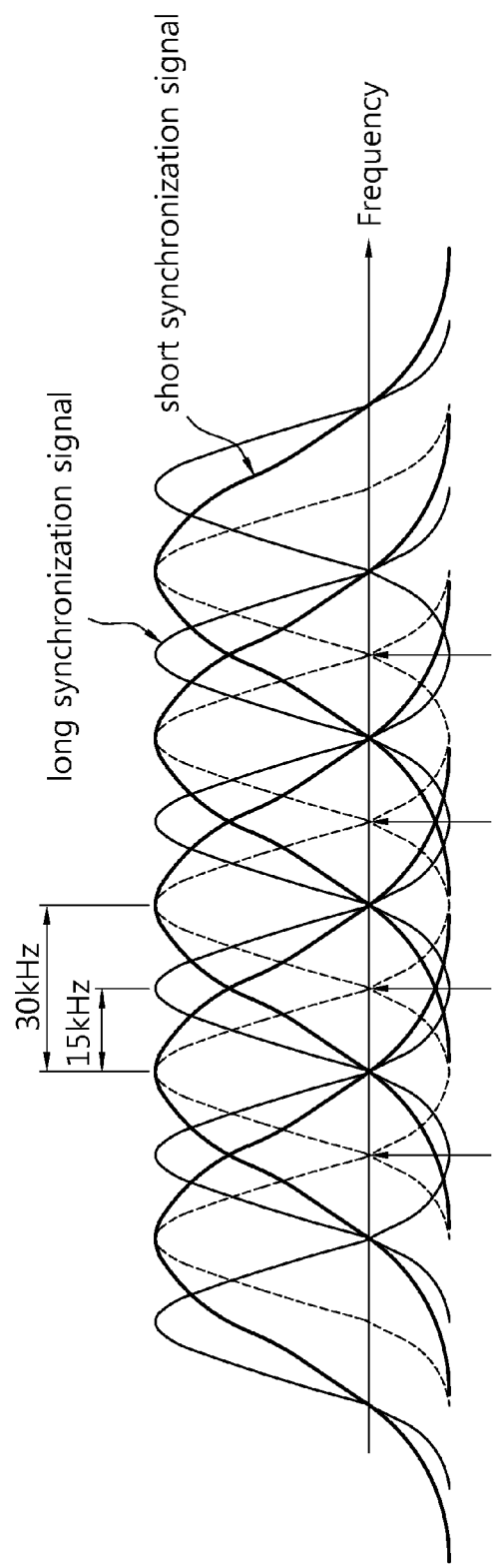
FIG. 9 shows a subcarrier waveform of a long synchronization signal and a short synchronization signal.

FIG. 9 shows a subcarrier waveform of a long synchronization signal and a short synchronization signal.

A 15 kHz subcarrier spacing corresponds to 1 OFDM symbol, and a 30 kHz subcarrier spacing corresponds to ½ OFDM symbol. That is, a signal which is repeated n times in a time domain is increased such that a subcarrier spacing is increased by n-fold in a frequency domain.

The long synchronization signal may be mapped to odd subcarriers (or even subcarriers) among subcarriers having the 15 kHz subcarrier spacing. The short synchronization signal may be mapped to subcarriers having the 30 kHz subcarrier spacing.

Therefore, the long synchronization signal and the short synchronization signal have the same subcarrier spacing of 30 kHz, but have different waveforms in a frequency domain. Each subcarrier has a shape of a sync function in the frequency domain, and comparing with a spacing of a zero crossing point, the short synchronization signal has a shape twice wider than the long synchronization signal. Therefore, it is not that a value of a subframe to which the short synchronization signal is mapped is exactly zero at a point in which a subframe to which the long synchronization signal is mapped has a maximum value. However, since a value thereof is not much great, it can be said that an influence thereof is not much great.

Figure 10:
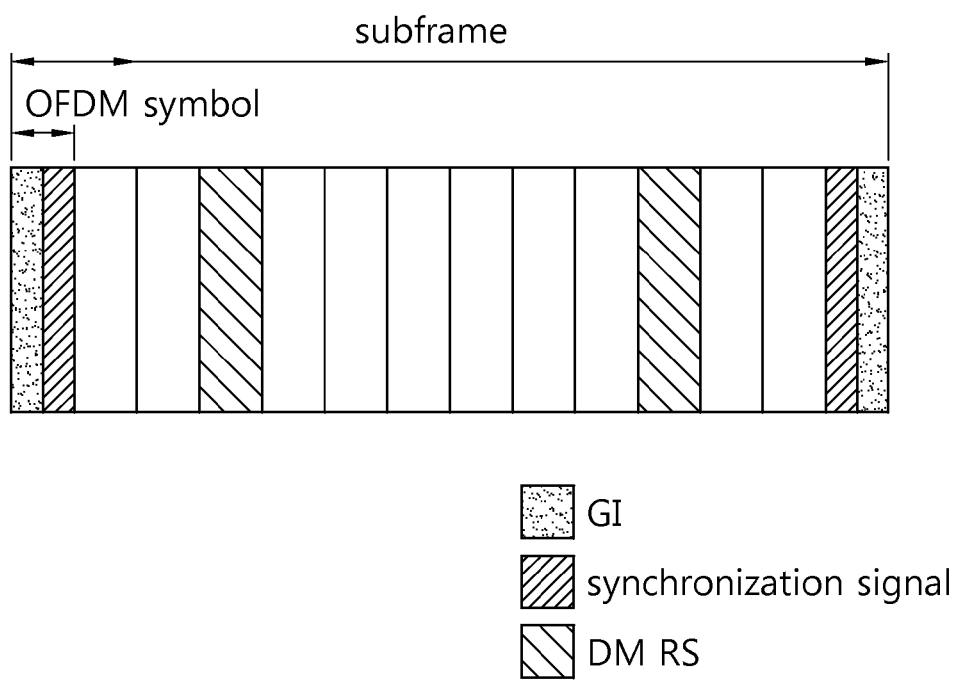
FIG. 10 shows a subframe structure according to another embodiment of the present invention.

FIG. 10 shows a subframe structure according to another embodiment of the present invention.

Synchronization signals may be used for different usages. The synchronization signal is transmitted in first and last OFDM symbols. A demodulation (DM) reference signal (RS) may be transmitted in $4^{th}$ and $11^{th}$ OFDM symbols. The DM RS may have the same structure as the aforementioned long synchronization signal. A location of the DM RS and the number of DM RSs are for exemplary purposes only.

Figure 11:
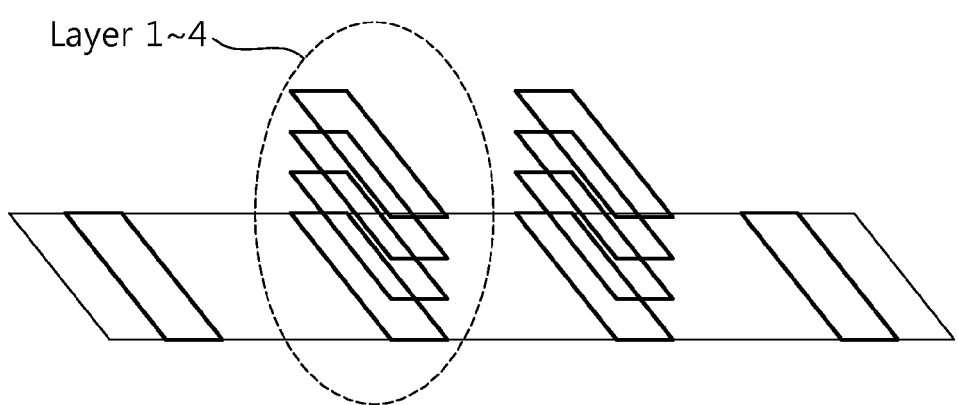
FIG. 11 shows an example of multi-layer transmission in a subframe structure of FIG. 10.

FIG. 11 shows an example of multi-layer transmission in a subframe structure of FIG. 10.

In a multiple input multiple output (MIMO) system, a plurality of layers may exist. The layer is a path for delivering information through a transmit antenna. A rank indicates the number of layers.

For example, assume that there are 4 layers. A DM RS used in data demodulation is transmitted in each layer by the number of layers. A synchronization signal used for synchronization may be transmitted without a distinction of the layers. This may be advantageous in a sense that an interference between the DM RS and the synchronization signal can be decreased and a synchronization can be obtained.

If the synchronization signal can also be used for data channel demodulation, an additional gain can be obtained in channel estimation for data demodulation. The same precoding may be applied to the synchronization signal and a DM RS of a specific layer. A receiver can perform more accurate channel estimation on the basis of the synchronization signal using the same precoding and the DM RS of the specific layer. For example, in the subframe of FIG. 11, the same precoding may be applied to a synchronization signal of a last OFDM symbol and a DM RS of a layer 1. Alternatively, if there are two or more layers, the same precoding may be applied to a DM RS of layers 1 and 2 and the synchronization signal.

Different transmit power may be assigned to the synchronization signal and the DM RS. The receiver may estimate a channel by considering a transmit power difference.

Figure 12:
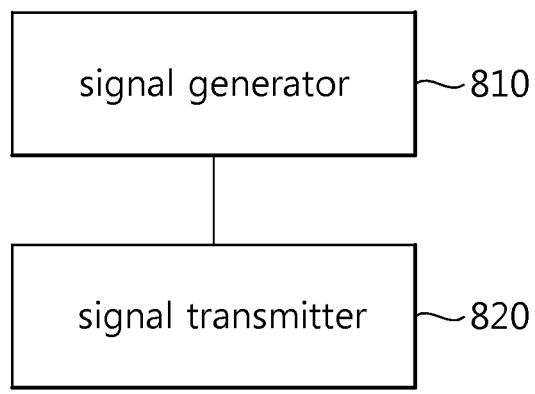
FIG. 12 is a block diagram showing a transmission device according to an embodiment of the present invention.

FIG. 12 is a block diagram showing a transmission device according to an embodiment of the present invention. The transmission device may be a part of a wireless device.

The transmission device includes a signal generator 810 and a signal transmitter 820. The signal generator 810 generates a synchronization signal and/or a DM RS. The signal generator 810 may generate a short synchronization signal and a long synchronization signal. The signal transmitter 820 transmits a synchronization signal in a subframe. The signal transmitter 820 may transmit the synchronization signal in the subframe shown in FIG. 3 to FIG. 6, and FIG. 10.

The signal generator 810 and/or the signal transmitter 820 may be implemented by a processor.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor.

The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A transmission method in a wireless communication system, the transmission method comprising:
   generating a synchronization signal for maintaining a synchronization between wireless devices;
   transmitting the synchronization signal in a subframe including a plurality of orthogonal frequency division multiplexing (OFDM) symbols; and
   transmitting a long synchronization signal in at least one of the plurality of OFDM symbols except for first and last OFDM symbols,
   wherein the first OFDM symbol of the subframe is divided into a first part and a second part,
   wherein the last OFDM symbol of the subframe is divided into a first part and a second part,
   wherein the synchronization signal is transmitted in the second part of the first OFDM symbol and the first part of the last OFDM symbol,
   wherein the first part of the first OFDM symbol and the second part of the last OFDM symbol are used as a guard interval (GI),
   wherein the long synchronization signal is configured such that the synchronization signal is transmitted repetitively n times, where n is an integer, and n>1, and
   wherein a subcarrier spacing of the long synchronization signal is 1/n-fold of a subcarrier spacing of the synchronization signal.

2. The transmission method of claim 1, wherein each of the first part and the second part has a size of ½ OFDM symbol.

3. A transmission device in a wireless communication system, the transmission device comprising:
   a signal generator for generating a synchronization signal for maintaining a synchronization; and
   a signal transmitter for transmitting the synchronization signal in a subframe including a plurality of orthogonal frequency division multiplexing (OFDM) symbols,
   wherein the signal transmitter transmits a long synchronization signal in at least one of the plurality of OFDM symbols except for first and last OFDM symbols,
   wherein the first OFDM symbol of the subframe is divided into a first part and a second part,
   wherein the last OFDM symbol of the subframe is divided into a first part and a second part,
   wherein the synchronization signal is transmitted in the second part of the first OFDM symbol and the first part of the last OFDM symbol,
   wherein the first part of the first OFDM symbol and the second part of the last OFDM symbol are used as a guard interval (GI),
   wherein the long synchronization signal is configured such that the synchronization signal is transmitted repetitively n times, where n is an integer, and n>1, and
   wherein a subcarrier spacing of the long synchronization signal is 1/n-fold of a subcarrier spacing of the synchronization signal.

4. The transmission device of claim 3, wherein each of the first part and the second part has a size of ½ OFDM symbol.

* * * * *